Patented Feb. 6, 1945

2,368,788

UNITED STATES PATENT OFFICE 2,368,788

MOLDING COMPOSITION

John S. Tinsley, Wilmington, Del., assignor to Hercules Powder Company, Wilmington, Del., a corporation of Delaware No Drawing. Application March 26, 1943, Serial No. 480,651

4 Claims. (Cl. 106—173)

This invention relates to molding compositions and more particularly to cellulose ester molding compositions with a resin constituent and a plasticizer.

Cellulose ester molding compositions have been formed previously from a cellulose ester, such as cellulose acetate, and one or more plasticizers, such as dimethyl phthalate. These compositions, particularly when used in molding, have been comparatively expensive for uses where only the cheaper plastics are feasible. In addition, while these compositions have proved valuable, they are subject to improvement in flow characteristics, surface conditions, and the lowering of the molding temperature.

Now in accordance with the present invention, a molding composition may be formed from a cellulose ester, a plasticizer therefor, and a petroleum-hydrocarbon insoluble pine wood resin, which molding composition is lower in price, has improved flow characteristics and surface conditions, and lower molding temperatures than cellulose ester compositions of the prior art. The petroleum-hydrocarbon insoluble pine wood resin is an inexpensive composition and may be combined with the cellulose ester composition in reasonably large proportions to reduce the cost of the entire composition as well as to improve it.

The molding composition may be prepared in several different ways. One method is by melting all of the materials together in the proper proportions and mixing them. Another method is to mix the ingredients in a common solvent or at least a solvent which dissolves the petroleum-hydrocarbon insoluble pine wood resin and the plasticizer and which softens the cellulose ester or forms a gel of it. The material containing the solvent is then milled until the solvent is removed as on a two-roll mill at a temperature high enough to evaporate off the solvent. Another method is by colloiding the cellulose ester and the plasticizer as by the use of a hot two-roll mill or by the hot melt procedure or Banbury mixer and then incorporating the petroleum-hydrocarbon insoluble pine wood resin.

The following are examples of the compositions and methods of preparing them:

Example 1

A composition comprising 60 parts of cellulose acetate, 20 parts of methyl phthalyl ethyl glycollate, and 20 parts of petroleum-hydrocarbon insoluble pine wood resin was prepared by melting and mixing all of the ingredients together at about 250° C. The composition was cooled, ground to a molding powder and molded at an elevated temperature in the form of a rod. The rod formed by this composition had a flexural strength of about 7000 lbs./sq. in. and a modulus of elasticity of about 140,000 lbs./sq. in.

Example 2

A composition comprising 70 parts of cellulose acetate, 20 parts of methyl phthalyl ethyl glycollate, and 10 parts of a petroleum-hydrocarbon insoluble pine wood resin was prepared by mixing the ingredients with 200 parts of a 50–50 mixture of acetone and alcohol, and allowing this composition to stand for several hours so that a gel was formed. The composition was placed on a two-roll mill heated to 150° C. and milled until substantially all of the solvent was removed. The composition was cooled, cut into molding powder, and molded in the form of a bar. This bar had an impact strength (Charpy) of about 0.46 lb./sq. in.

Example 3

75 parts of cellulose acetate, and 15 parts of methyl phthalyl ethyl glycollate were placed in a two-roll mill at a temperature of about 160° C. and colloided. After the composition had been colloided, 10 parts of petroleum-hydrocarbon insoluble pine wood resin were added, the mill was cooled to about 65° C., the product was removed and ground to a molding powder. The composition was then molded in the form of a sheet which had improved surface gloss and flow characteristics.

Example 4

60 parts of petroleum-hydrocarbon insoluble pine wood resin, and 20 parts of dibutyl phthalate were heated together to a temperature of 210° to 220° C. This temperature was maintained with agitation and 20 parts of cellulose acetate with a substitution equivalent to 57.5% acetic acid were added. Stirring was continued at the above temperature until the cellulose acetate dissolved completely, and the mixture became homogeneous and smooth which required about 15 minutes. This mixture was then cast into a mold by pouring. When cool, it was found to be tough and to have perfectly reproduced the mold impression.

Example 5

A composition comprising 57.5 parts of petroleum-hydrocarbon insoluble pine wood resin, 11 parts of cellulose acetate, 30 parts of methyl phthalyl ethyl glycollate, and 1.5 parts of paraffin was prepared by melting and mixing all of the ingredients together at about 250° C. The composition was applied to a web of paper by means of a roller.

Example 6

20 parts of cellulose acetate, 60 parts of petroleum-hydrocarbon insoluble pine wood resin, and 20 parts of methyl phthalyl ethyl glycollate were heated together at a temperature of about 220° C. The mixture was agitated at the above temperature for about 15 minutes. The material was then cast in the form of phonograph recording discs. The resultant discs were found to be tough and had improved surface gloss and flow characteristics.

The proportions of the ingredients used will vary considerably depending upon the type of product to be obtained within the broad range of from about 5% to about 90% of cellulose acetate, from about 5% to about 90% of the petroleum-hydrocarbon insoluble pine wood resin, and from about 5% to about 30% of the plasticizer. However, desirable results are obtained at low cost with a composition within the range of from about 10% to about 30% of cellulose acetate, from about 50% to about 70% of petroleum-hydrocarbon insoluble pine wood resin and from about 15% to about 30% of plasticizer.

The cellulose acetate used in the present invention may be any of the types commercially available, but will, in general, have an acetic acid content of from about 52% to about 58.5% and a viscosity of from about 10 to 250 seconds (determined as the time of fall in seconds of a $\frac{1}{8}$ in. steel ball through 10 ins. of a 20% solution of the cellulose ester in 90—10 acetone-ethanol mixture in a 1 in. tube at 25° C.).

The plasticizer used may be any of the well-known plasticizers for the cellulose esters which are also compatible with the petroleum-hydrocarbon insoluble pine wood resin, such as, dimethyl, diethyl, and dibutyl phthalate; methyl cellosolve phthalate; methyl phthalyl ethyl glycollate; ethyl toluene sulphonamid; acetyl triethyl citrate; triphenyl phosphate; ethyl p-toluene sulfonate; diphenyl tartrate; diethylene glycol dipropionate; etc. or mixtures thereof.

The material which is characterized by the term "substantially petroleum-hydrocarbon insoluble pine wood resin," herein and in the appended claims, is the resinous material which may be prepared from pine wood, preferably from stump pine wood, in the following manner. The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present compositions. Extraction of this mixture with a petroleum hydrocarbon, such as, for example, gasoline, dissolves and removes the rosin. After separation of the rosin, high in abietic acid, a resinous residue remains which is low in abietic acid. Alternatively, the residue of the initial coal tar hydrocarbon extract may be treated with a mixture of a petroleum hydrocarbon, as gasoline and furfural, and the two layers which form separated, in which case the petroleum-hydrocarbon insoluble pine wood resin is found dissolved in the furfural from which it may be obtained by evaporation of the furfural. Other methods of isolating the desired petroleum-hydrocarbon insoluble pine wood resin may be employed, if desired, such as with use of other solvents for extracting the total resin content from the wood. The resin may be defoamed by steaming or heat treated to remove volatile substances. This resinous material, used in the composition of the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha and toluol insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%), an acid number in the range from about 90 to about 110, and a drop melting point in the range from about 95° C. to about 125° C.

While all of the examples illustrate the use of cellulose acetate, the use of other cellulose esters is contemplated such as cellulose butyrate, cellulose propionate, cellulose acetate butyrate, cellulose acetate propionate, cellulose caproate, or mixtures thereof, etc.

The composition may be varied within the ranges outlined above for use in casting, extruding, and compression or injection molding. In the case of injection molding, the preferable ranges are from about 60% to about 75% of cellulose ester, from about 5% to about 15% of the petroleum-hydrocarbon insoluble pine wood resin, and about 20% to about 30% of plasticizer.

Thus, the present invention has described a new and useful molding composition which is inexpensive, has improved flow characteristics in the molds, improved surface and a lower molding temperature.

What I claim and desire to protect by Letters Patent is:

1. A substantially dry molding composition comprising from about 10% to about 30% of cellulose acetate having an acetic acid content of from about 52% to about 58.5%, from about 50% to about 70% of a petroleum-hydrocarbon insoluble pine wood resin, and from about 15% to about 30% of a plasticizer.

2. A substantially dry molding composition comprising from about 10% to about 30% of cellulose acetate having an acetic acid content of from about 52% to about 58.5%, from about 50% to about 70% of a substantially petroleum-hydrocarbon-insoluble pine wood resin, and from about 15% to about 30% of dibutyl phthalate.

3. A substantially dry molding composition comprising from about 10% to about 30% cellulose acetate having an acetic acid content of from about 52% to about 58.5%, from about 50% to about 70% of a substantially petroleum-hydrocarbon-insoluble pine wood resin, and from about 15% to about 30% of triphenyl phosphate.

4. A substantially dry molding composition comprising from about 10% to about 30% of cellulose acetate having an acetic acid content of from about 52% to about 58.5%, from about 50% to about 70% of a substantially petroleum-hydrocarbon-insoluble pine wood resin, and from about 15% to about 30% of methyl phthalyl ethyl glycollate.

JOHN S. TINSLEY.

CERTIFICATE OF CORRECTION.

Patent No. 2,368,788.  February 6, 1945.

JOHN S. TINSLEY.

It is hereby certified that error appears in the printed specification of the above numbered patent requiring correction as follows: Page 2, second column, line 50, claim 1, before "petroleum-hydrocarbon" insert --substantially--; and that the said Letters Patent should be read with this correction therein that the same may conform to the record of the case in the Patent Office.

Signed and sealed this 22nd day of May, A. D. 1945.

Leslie Frazer (Seal)  Acting Commissioner of Patents.